(12) United States Patent
Wheeler (10) Patent No.: US 11,134,612 B2
(45) Date of Patent: Oct. 5, 2021

(54) LAWN MOWER TO WEED TRIMMER ATTACHMENT APPARATUS

(71) Applicant: Benjamin Wheeler, Spokane Valley, WA (US)

(72) Inventor: Benjamin Wheeler, Spokane Valley, WA (US)

(*) Notice: Subject to any disclaimer, the term of this patent is extended or adjusted under 35 U.S.C. 154(b) by 84 days.

(21) Appl. No.: 16/542,030

(22) Filed: Aug. 15, 2019

(65) Prior Publication Data

US 2021/0045289 A1 Feb. 18, 2021

(51) Int. Cl.
| | |
|---|---|
| *A01D 43/16* | (2006.01) |
| *A01D 34/00* | (2006.01) |
| *F16M 13/02* | (2006.01) |
| *A01D 101/00* | (2006.01) |
| *A01D 34/416* | (2006.01) |

(52) U.S. Cl.
CPC .......... *A01D 43/16* (2013.01); *A01D 34/001* (2013.01); *F16M 13/022* (2013.01); *A01D 34/416* (2013.01); *A01D 2101/00* (2013.01)

(58) Field of Classification Search
CPC .. A01D 34/4165; A01D 43/16; A01D 67/005; A01D 75/006; A01D 75/008; A01D 2101/00; A01D 34/001; A01D 34/416; F16M 13/022
USPC .......................... D15/7, 28; 248/218.4–219.4
See application file for complete search history.

(56) References Cited

U.S. PATENT DOCUMENTS

| | | | | |
|---|---|---|---|---|
| 3,789,591 | A * | 2/1974 | Emery | A01D 43/16 56/16.9 |
| 4,152,882 | A * | 5/1979 | Howard | A01D 34/001 464/52 |
| 4,182,100 | A * | 1/1980 | Letter | A01D 34/416 172/17 |
| 4,242,855 | A * | 1/1981 | Beaver, Jr. | A01D 34/001 56/11.8 |
| 4,541,230 | A * | 9/1985 | Huerter | A01D 42/02 56/193 |
| 5,022,420 | A * | 6/1991 | Brim | A01D 67/02 135/161 |
| 5,303,532 | A * | 4/1994 | Phillips | A01D 34/863 56/12.7 |
| D359,291 | S | 6/1995 | Tihonovich | |

(Continued)

FOREIGN PATENT DOCUMENTS

WO WO2004021766 3/2004

*Primary Examiner* — Thomas B Will
*Assistant Examiner* — Joan D Misa (57) ABSTRACT

A lawn mower to weed trimmer attachment apparatus for simultaneously weed trimming and lawn mowing includes a pair of attachment arms each comprising an upper arm and a lower arm. The upper arm has a threaded adjustment aperture to receive an adjustment bolt to selectively engage the lower arm and fix the height of the attachment arm. A trimmer cradle is coupled to the upper arm and is configured to receive a trimmer arm of a weed trimmer. A mower tube is coupled to the lower arm. The mower tube has an attachment aperture and is configured to receive an attachment hardware set. The mower tube is configured to receive the mower arm of a lawn mower. A pair of cross braces extends between the pair of attachment arms and a support brace is coupled to the mower arm.

7 Claims, 5 Drawing Sheets

(56) References Cited

U.S. PATENT DOCUMENTS

| | | | |
|---|---|---|---|
| 5,626,006 A * | 5/1997 | Fricke, Sr. | A01D 34/001 30/276 |
| 5,647,489 A * | 7/1997 | Bellis, Jr. | A47B 81/005 211/208 |
| 5,829,236 A * | 11/1998 | Ballard | A01D 34/001 56/16.7 |
| 5,836,142 A * | 11/1998 | Maxwell | A01D 34/001 56/12.1 |
| D402,433 S * | 12/1998 | Wells | D34/24 |
| 5,992,811 A * | 11/1999 | McFerren | A01D 34/001 248/113 |
| 6,073,781 A * | 6/2000 | Puglisi | B25H 3/04 211/60.1 |
| 6,173,842 B1 * | 1/2001 | Fitzgerald | B60R 9/00 211/4 |
| 6,409,029 B1 * | 6/2002 | Bermes | A01D 75/004 211/207 |
| 6,457,695 B1 * | 10/2002 | Tausanovitch | A01D 34/001 211/60.1 |
| 6,494,427 B1 * | 12/2002 | Smith | A01D 34/001 224/401 |
| 6,494,445 B1 * | 12/2002 | Bellis, Jr. | B25B 5/006 269/4 |
| 6,601,374 B2 * | 8/2003 | Smith | A01D 43/16 56/12.7 |
| 6,619,485 B1 * | 9/2003 | Jenkins | E05B 73/00 211/4 |
| 6,908,052 B1 * | 6/2005 | Jacobson | A01D 43/14 239/146 |
| 6,986,238 B1 | 1/2006 | Bloodworth | |
| 7,028,455 B1 * | 4/2006 | Liguras | A01D 34/001 56/13.6 |
| 7,165,383 B1 | 1/2007 | Luton | |
| 7,644,565 B2 | 1/2010 | Uihlein | |
| 7,644,846 B2 * | 1/2010 | Hafendorfer | B60P 7/08 224/405 |
| D616,904 S | 6/2010 | Armstrong | |
| 7,823,370 B1 * | 11/2010 | Wiebe | A01B 73/00 56/12.7 |
| 8,046,980 B1 | 11/2011 | Schroek | |
| D661,320 S * | 6/2012 | Armstrong | D15/17 |
| 9,510,506 B2 | 12/2016 | Castelli | |
| 10,772,259 B2 * | 9/2020 | Parker | F16M 11/2014 |
| 10,791,669 B2 * | 10/2020 | Dretzka | B60R 11/06 |
| 2006/0207235 A1 | 9/2006 | Izatt | |
| 2010/0000192 A1 * | 1/2010 | Robison | A01D 34/84 56/10.2 R |
| 2015/0101302 A1 * | 4/2015 | Cooper | A01D 43/16 56/13.7 |

* cited by examiner

LAWN MOWER TO WEED TRIMMER ATTACHMENT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to landscaping devices and more particularly pertains to a new landscaping device for simultaneously weed trimming and lawn mowing.

(2) Description of Related Art Including Information Disclosed Under 37 CFR 1.97 and 1.98

The prior art relates to landscaping devices.

BRIEF SUMMARY OF THE INVENTION

An embodiment of the disclosure meets the needs presented above by generally comprising a pair of attachment arms comprising a back arm and a front arm. Each of the back arm and front arm comprises an upper arm having an upper left side, an upper right side, an upper front side, an upper back side, an upper top side, and an open upper bottom side. The upper left side has a threaded adjustment aperture extending therethrough proximal the upper bottom side and a top brace aperture extending therethrough. A lower arm is telescopably coupled within the upper bottom side. A lower left side of the lower arm has a bottom brace aperture extending therethrough. The threaded adjustment aperture receives an adjustment bolt to selectively engage the upper arm. A trimmer cradle is U-shaped and coupled within the upper top side such that a pair of arms of the trimmer cradle lies adjacent the upper left side and the upper right side of the upper arm. A security aperture extends through the upper left side, the pair of arms, and the upper right side and is configured to receive a security hardware set. The trimmer cradle is configured to receive a trimmer arm of a weed trimmer. A mower tube is coupled to a lower bottom side of the lower arm. The mower tube has an attachment aperture extending therethrough and is configured to receive an attachment hardware set. The mower tube is configured to receive a first mower arm of a lawn mower. A pair of cross braces is coupled to the pair of attachment arms. The pair of cross braces comprises a first cross brace extending from the bottom brace aperture of the front arm to the top brace aperture of the back arm and a second cross brace extending from the bottom brace aperture of the back arm to the top brace aperture of the front arm. A support brace is coupled within a support aperture extending through the upper back side of the upper arm. A distal end of the support brace is configured to be coupled to a second mower arm of the lawn mower.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new landscaping device embodying the principles and concepts of an embodiment of the disclosure and generally designated by the reference numeral 10 will be described.

As best illustrated in FIGS. 1 through 5, the lawn mower to weed trimmer attachment apparatus 10 generally comprises a pair of attachment arms 12 comprising a back arm 14 and a front arm 16. Each of the front arm 16 and the back arm 14 comprise an upper arm 18 having an upper left side 22, an upper right side 24, an upper front side 26, an upper back side 28, an upper top side 30, and an open upper bottom side 32. The upper left side 22 has a threaded adjustment aperture 34 extending therethrough proximal the upper bottom side 32 and a top brace aperture 36 extending therethrough. A lower arm 38 is telescopably coupled within the upper bottom side 32. A lower left side 40 of the lower arm 38 has a bottom brace aperture 42 extending therethrough. The upper arm 18 and the lower arm 38 may be square tubing. The threaded adjustment aperture 34 receives an adjustment bolt 44 to selectively engage the upper arm 18 and fix the attachment arm 12 at a desired height. A trimmer cradle 46 is U-shaped and is coupled within the upper top side 30 such that a pair of arms 48 of the trimmer cradle 46 lies adjacent the upper left side 22 and the upper right side 24 of the upper arm 18. A security aperture 50 extends through the upper left side 22, the pair of arms 48, and the upper right side 24 and is configured to receive a security hardware set 52. The trimmer cradle 46 is configured to receive a trimmer arm 54 of a weed trimmer 56 and the security hardware set 52 secures the trimmer arm 54 in place. A mower tube 58 is coupled to a lower bottom side 60 of the lower arm 38. The mower tube 58 has an attachment aperture 60 extending therethrough and is configured to receive an attachment hardware set 62. The mower tube 58 is configured to receive a first mower arm 64 of a lawn mower 66.

A pair of cross braces 68 is coupled to the pair of attachment arms 12. The pair of cross braces 68 comprises a first cross brace 70 extending from the bottom brace aperture 42 of the front arm 16 to the top brace aperture 36 of the back arm 14 and a second cross brace 72 extending from the bottom brace aperture 42 of the back arm 14 to the top brace aperture 36 of the front arm 16. Each of the cross braces 68 comprises a brace upper portion 74, a brace lower portion 76, and a cross adjuster 78 threadably connected to each of the brace upper portion 74 and the brace lower portion 76. The cross adjuster 78 is rotatable to adjust an overall length of each cross brace 68. An upper end 80 of each brace upper portion 74 is bent perpendicularly and is selectively engageable within the top brace aperture 36. A lower end 82 of each brace lower portion 76 is bent perpendicularly and is selectively engageable within the bottom brace aperture 42.

A support brace 84 is coupled within a support aperture 86 extending through the upper back side 28 of the upper arm 18. A distal end 88 of the support brace 84 is configured to be coupled to a second mower arm 90 of the lawn mower 66. The support brace 84 comprises a support upper portion 92, a support lower portion 94, and a support adjuster 96 threadably connected to each of the support upper portion 92 and the support lower portion 94. The support adjuster 96 is rotatable to adjust an overall length of the support brace 84. Each of the cross adjusters 78 and the support adjuster 96 may be faceted and may have six facets. A top end 98 of the support upper portion 92 is bent perpendicularly and is selectively engageable within the support aperture 86. A bottom end 100 of the support lower portion 94 is bent perpendicularly and is configured to be coupled to the second mower arm 90 of the lawn mower 66.

Figure 1:
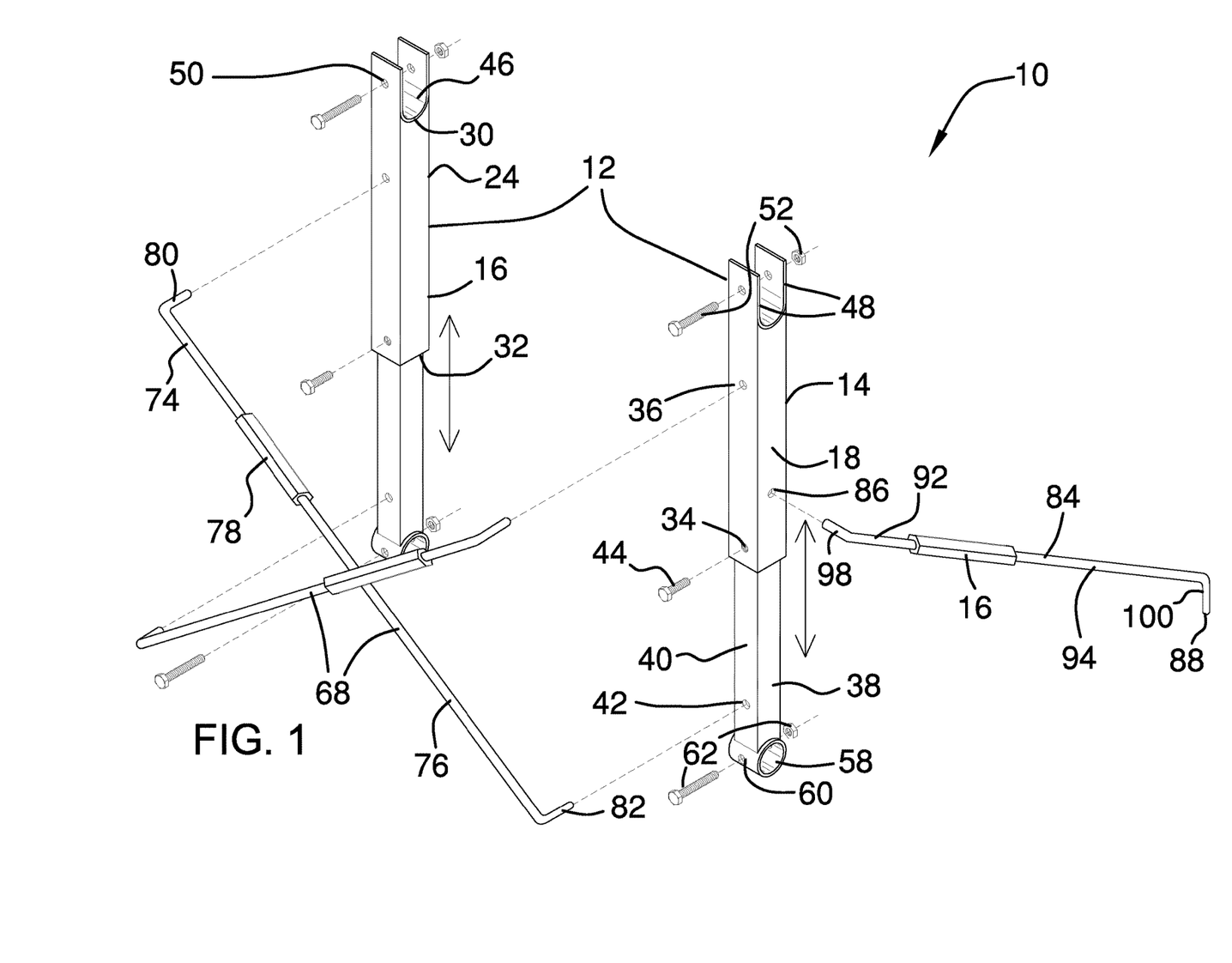
FIG. 1 is an exploded isometric view of a lawn mower to weed trimmer attachment apparatus according to an embodiment of the disclosure.
Figure 2:
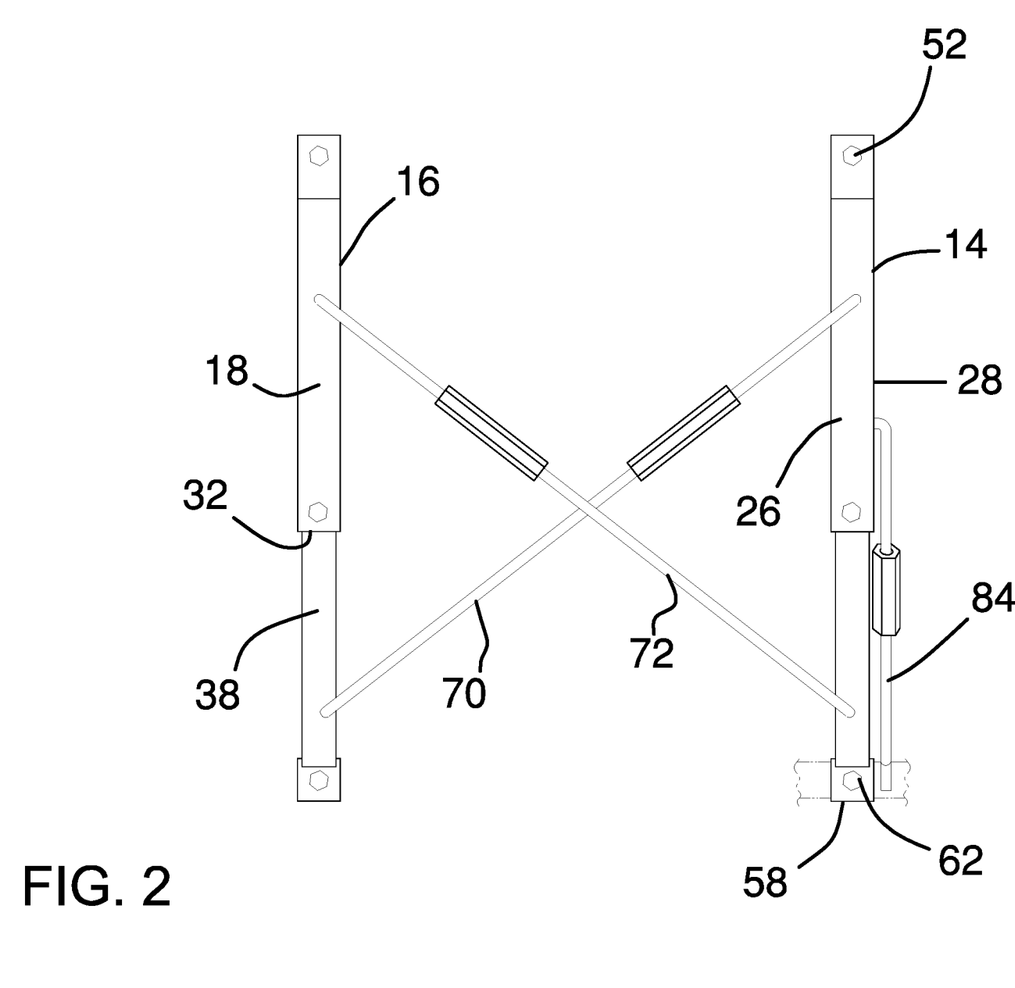
FIG. 2 is a front elevation view of an embodiment of the disclosure.
Figure 3:
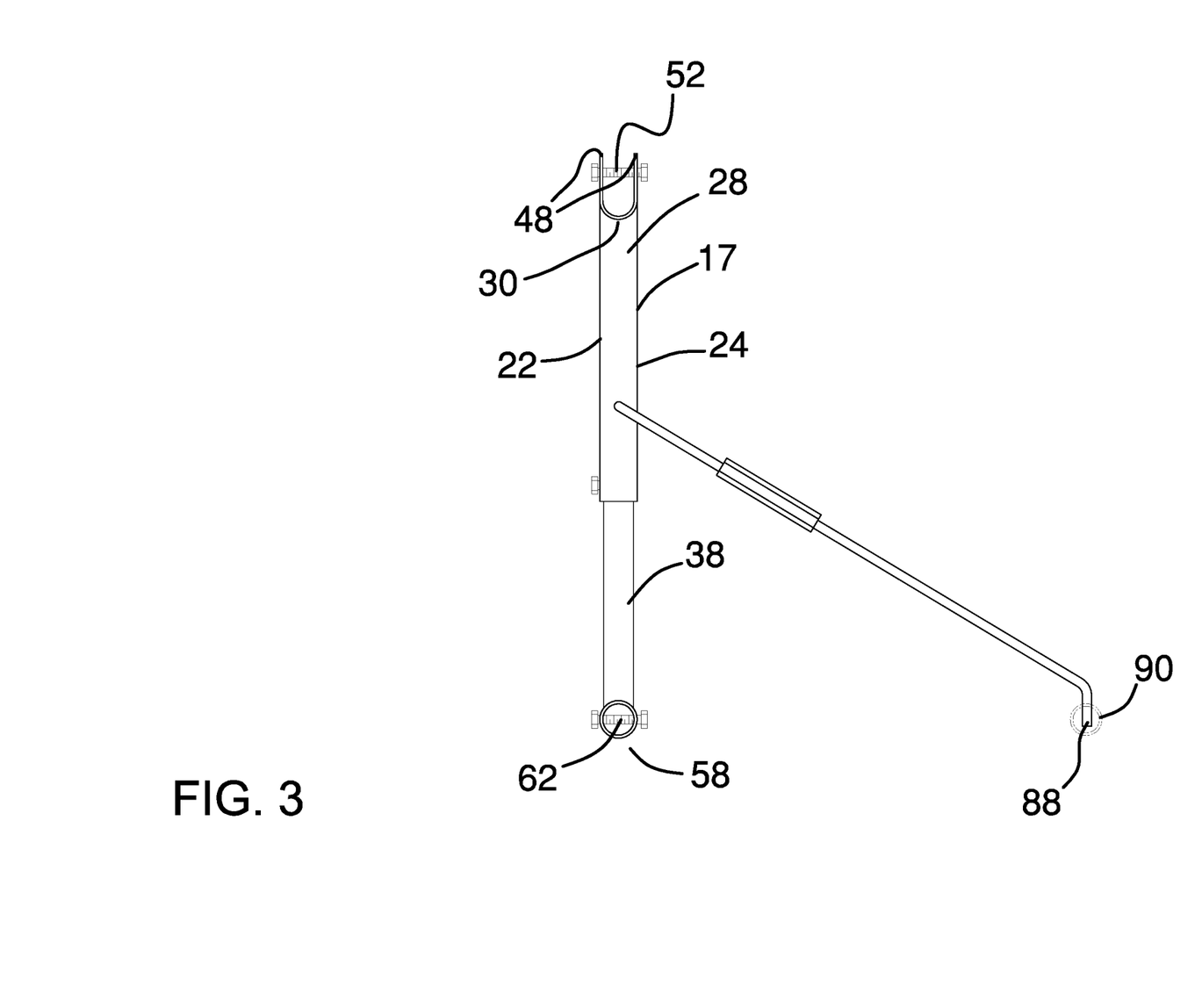
FIG. 3 is a side elevation view of an embodiment of the disclosure.
Figure 4:
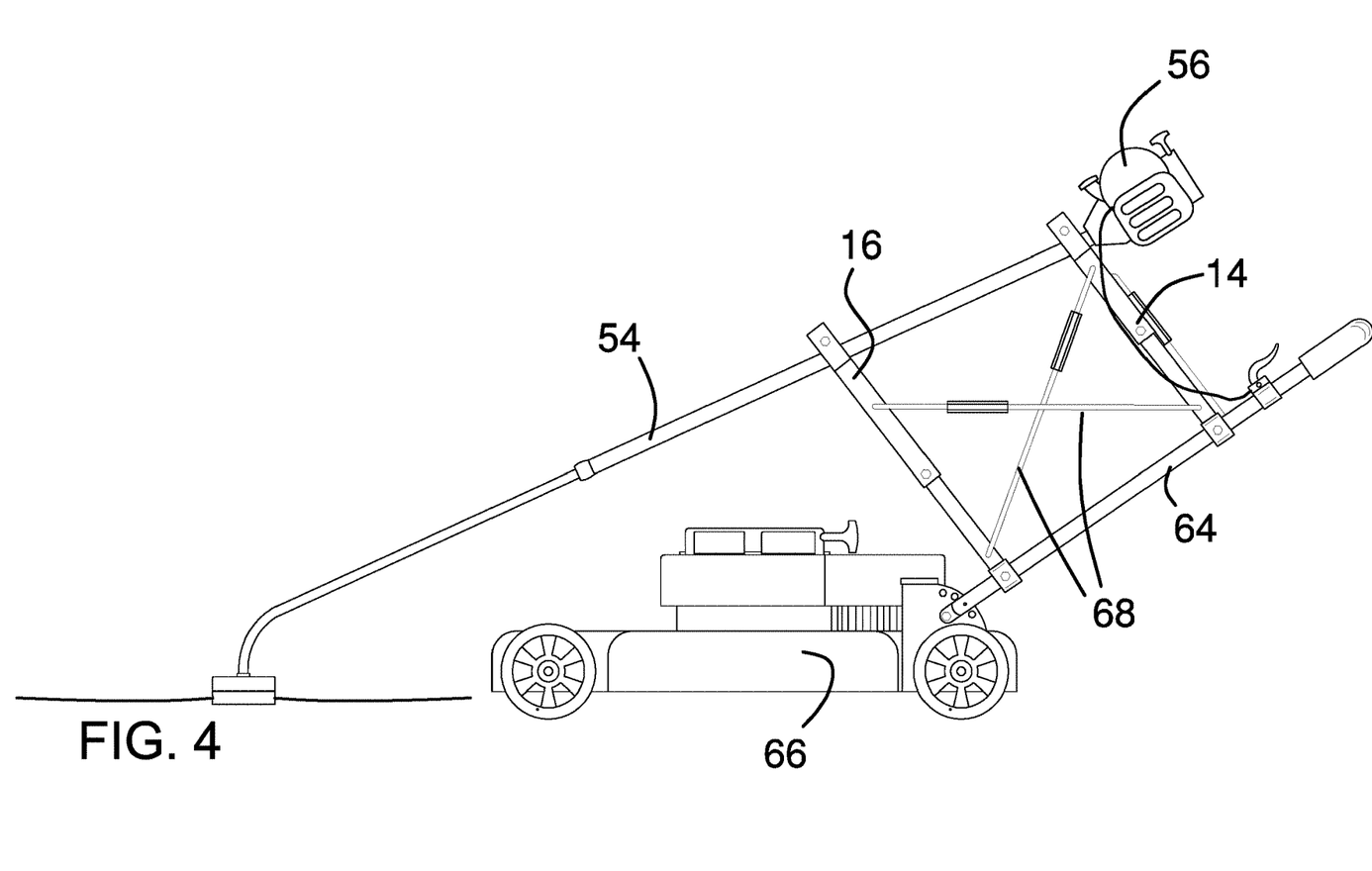
FIG. 4 is an in-use view of an embodiment of the disclosure.
Figure 5:
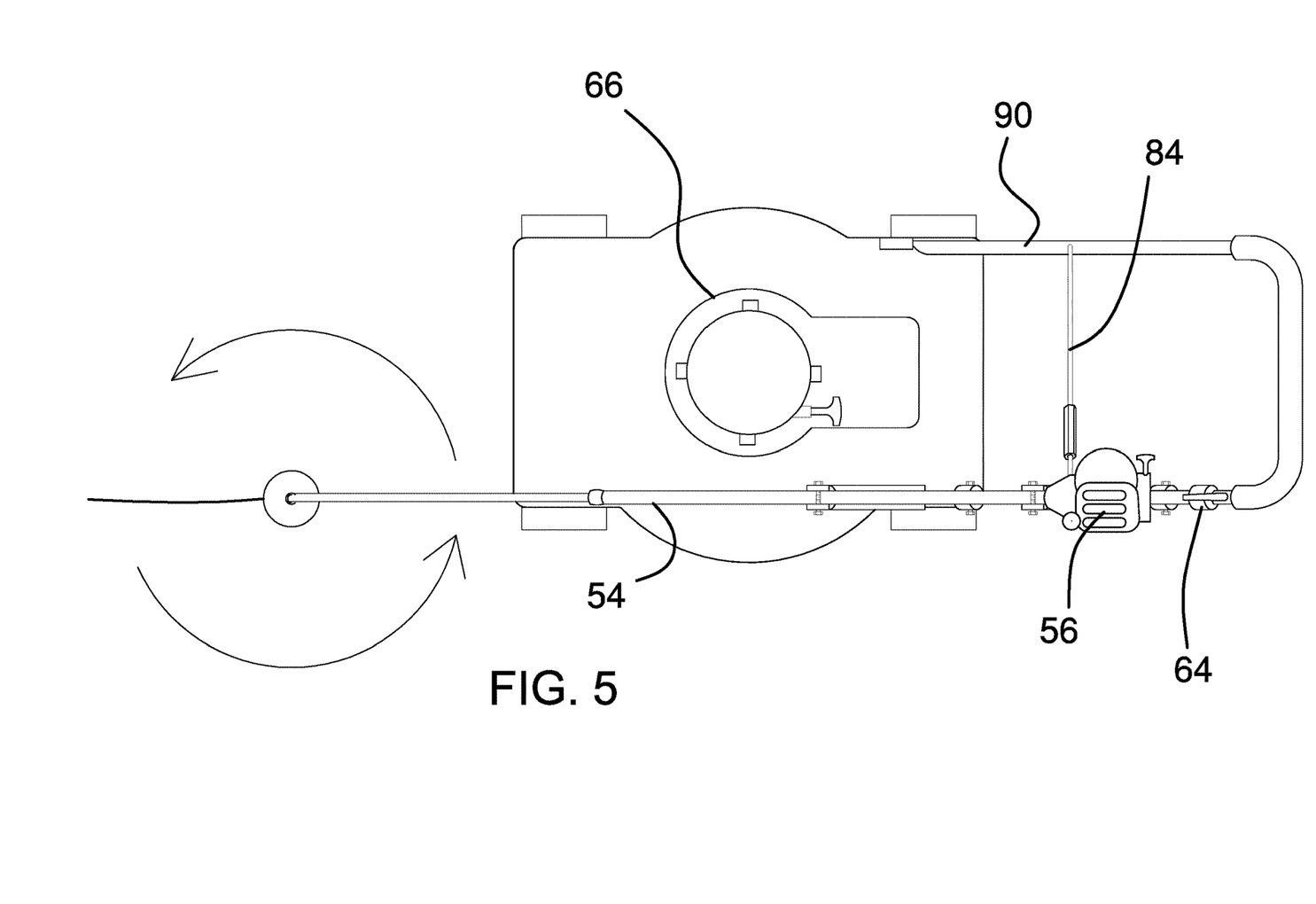
FIG. 5 is an in-use view of an embodiment of the disclosure.

In use, the trimmer cradle 46 receives the trimmer arm 54 of the weed trimmer 56. The adjustment bolt 44 is used to adjust the height of each of the upper arm 18 and the lower arm 38 to properly angle the weed trimmer 56. The cross adjuster 78 is used to adjust the length of the pair of cross braces 68. The distal end 88 of the support brace 84 is coupled to the second mower arm 90 of the lawn mower 66. The lawn mower 66 and the weed trimmer 56 are used simultaneously to trim and mow a lawn.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lawn mower to weed trimmer attachment apparatus comprising:
   a pair of attachment arms, the pair of attachment arms comprising a back arm and a front arm each comprising:
      an upper arm, the upper arm having an upper left side, an upper right side, an upper front side, an upper back side, an upper top side, and an open upper bottom side, the upper left side having a threaded adjustment aperture extending therethrough proximal the upper bottom side and a top brace aperture extending therethrough;
      a lower arm coupled to the upper arm, the lower arm being telescopably coupled within the upper bottom side, a lower left side of the lower arm having a bottom brace aperture extending therethrough, the threaded adjustment aperture receiving an adjustment bolt to selectively engage the upper arm;
      a trimmer cradle coupled to the upper arm, the trimmer cradle being U-shaped and coupled within the upper top side such that a pair of cradle arms of the trimmer cradle lies adjacent the upper left side and the upper right side of the upper arm, a security aperture extending through the upper left side, the pair of cradle arms, and the upper right side and configured to receive a security hardware set, the trimmer cradle being configured to receive a trimmer arm of a weed trimmer; and
      a mower tube coupled to the lower arm, the mower tube being coupled to a lower bottom side of the lower arm, the mower tube having an attachment aperture extending therethrough and configured to receive an attachment hardware set, the mower tube being configured to receive a first mower arm of a lawn mower;
   a pair of cross braces coupled to the pair of attachment arms, the pair of cross braces comprising a first cross brace extending from the bottom brace aperture of the front arm to the top brace aperture of the back arm and a second cross brace extending from the bottom brace aperture of the back arm to the top brace aperture of the front arm;
   a support brace coupled to the back arm, the support brace being coupled within a support aperture extending through the upper back side of the upper arm, a distal end of the support brace being configured to be coupled to a second mower arm of the lawn mower; and each of the cross braces comprising a brace upper portion, a brace lower portion, and a cross adjuster threadably connected to each of the brace upper portion and the brace lower portion, the cross adjuster being rotatable to adjust an overall length of each cross brace, the support brace comprising a support upper portion, a support lower portion, and a support adjuster threadably connected to each of the support upper portion and the support lower portion, the support adjuster being rotatable to adjust an overall length of the support brace.

2. The lawn mower to weed trimmer attachment apparatus of claim 1 further comprising each of the cross adjusters and the support adjuster being faceted.

3. The lawn mower to weed trimmer attachment apparatus of claim 1 further comprising an upper end of each brace upper portion being bent perpendicularly and being selectively engageable within the top brace aperture, a lower end of each brace lower portion being bent perpendicularly and being selectively engageable within the bottom brace aperture.

4. The lawn mower to weed trimmer attachment apparatus of claim 1 further comprising a top end of the support upper portion being bent perpendicularly and being selectively engageable within the support aperture, a bottom end of the support lower portion being bent perpendicularly and configured to be coupled to the second mower arm of the lawn mower.

5. The lawn mower to weed trimmer attachment apparatus of claim 1 further comprising the upper arm and the lower arm being square tubing.

6. A lawn mower to weed trimmer attachment apparatus comprising:
  a pair of attachment arms, the pair of attachment arms comprising a back arm and a front arm each comprising:
    an upper arm, the upper arm having an upper left side, an upper right side, an upper front side, an upper back side, an upper top side, and an open upper bottom side, the upper left side having a threaded adjustment aperture extending therethrough proximal the upper bottom side and a top brace aperture extending therethrough;
    a lower arm coupled to the upper arm, the lower arm being telescopably coupled within the upper bottom side, a lower left side of the lower arm having a bottom brace aperture extending therethrough, the upper arm and the lower arm being square tubing, the threaded adjustment aperture receiving an adjustment bolt to selectively engage the upper arm;
    a trimmer cradle coupled to the upper arm, the trimmer cradle being U-shaped and coupled within the upper top side such that a pair of cradle arms of the trimmer cradle lies adjacent the upper left side and the upper right side of the upper arm, a security aperture extending through the upper left side, the pair of cradle arms, and the upper right side and configured to receive a security hardware set, the trimmer cradle being configured to receive a trimmer arm of a weed trimmer; and
    a mower tube coupled to the lower arm, the mower tube being coupled to a lower bottom side of the lower arm, the mower tube having an attachment aperture extending therethrough and configured to receive an attachment hardware set, the mower tube being configured to receive a first mower arm of a lawn mower;
  a pair of cross braces coupled to the pair of attachment arms, the pair of cross braces comprising a first cross brace extending from the bottom brace aperture of the front arm to the top brace aperture of the back arm and a second cross brace extending from the bottom brace aperture of the back arm to the top brace aperture of the front arm, each of the cross braces comprising a brace upper portion, a brace lower portion, and a cross adjuster threadably connected to each of the brace upper portion and the brace lower portion, the cross adjuster being rotatable to adjust an overall length of each cross brace, an upper end of each brace upper portion being bent perpendicularly and being selectively engageable within the top brace aperture, a lower end of each brace lower portion being bent perpendicularly and being selectively engageable within the bottom brace aperture; and
  a support brace coupled to the back arm, the support brace being coupled within a support aperture extending through the upper back side of the upper arm, a distal end of the support brace being configured to be coupled to a second mower arm of the lawn mower, the support brace comprising a support upper portion, a support lower portion, and a support adjuster threadably connected to each of the support upper portion and the support lower portion, the support adjuster being rotatable to adjust an overall length of the support brace, each of the cross adjusters and the support adjuster being faceted, a top end of the support upper portion being bent perpendicularly and being selectively engageable within the support aperture, a bottom end of the support lower portion being bent perpendicularly and configured to be coupled to the second mower arm of the lawn mower.

7. A lawn mower to weed trimmer attachment apparatus and lawn mower and weed trimmer system comprising:
  a lawn mower, the lawn mower having a first mower arm and a second mower arm extending from a mower handle to a mower body;
  a weed trimmer, the weed trimmer having a trimmer arm;
  a pair of attachment arms, the pair of attachment arms comprising a back arm and a front arm each comprising:
    an upper arm, the upper arm having an upper left side, an upper right side, an upper front side, an upper back side, an upper top side, and an open upper bottom side, the upper left side having a threaded adjustment aperture extending therethrough proximal the upper bottom side and a top brace aperture extending therethrough;
    a lower arm coupled to the upper arm, the lower arm being telescopably coupled within the upper bottom side, a lower left side of the lower arm having a bottom brace aperture extending therethrough, the upper arm and the lower arm being square tubing, the threaded adjustment aperture receiving an adjustment bolt to selectively engage the upper arm;
    a trimmer cradle coupled to the upper arm, the trimmer cradle being U-shaped and coupled within the upper top side such that a pair of cradle arms of the trimmer cradle lies adjacent the upper left side and the upper right side of the upper arm, a security aperture extending through the upper left side, the pair of cradle arms, and the upper right side and configured to receive a security hardware set, the trimmer cradle receiving the trimmer arm of the weed trimmer; and a mower tube coupled to the lower arm, the mower tube being coupled to a lower bottom side of the lower arm, the mower tube having an attachment aperture extending therethrough and configured to receive an attachment hardware set, the mower tube receiving the first mower arm of the lawn mower;

a pair of cross braces coupled to the pair of attachment arms, the pair of cross braces comprising a first cross brace extending from the bottom brace aperture of the front arm to the top brace aperture of the back arm and a second cross brace extending from the bottom brace aperture of the back arm to the top brace aperture of the front arm, each of the cross braces comprising a brace upper portion, a brace lower portion, and a cross adjuster threadably connected to each of the brace upper portion and the brace lower portion, the cross adjuster being rotatable to adjust an overall length of each cross brace, an upper end of each brace upper portion being bent perpendicularly and being selectively engageable within the top brace aperture, a lower end of each brace lower portion being bent perpendicularly and being selectively engageable within the bottom brace aperture; and a support brace coupled to the back arm, the support brace being coupled within a support aperture extending through the upper back side of the upper arm, a distal end of the support brace being coupled to the second mower arm of the lawn mower, the support brace comprising a support upper portion, a support lower portion, and a support adjuster threadably connected to each of the support upper portion and the support lower portion, the support adjuster being rotatable to adjust an overall length of the support brace, each of the cross adjusters and the support adjuster being faceted, a top end of the support upper portion being bent perpendicularly and being selectively engageable within the support aperture, a bottom end of the support lower portion being bent perpendicularly and coupled to the second mower arm of the lawn mower.

* * * * *